(12) United States Patent
Subramanian et al.

(10) Patent No.: US 8,589,707 B2
(45) Date of Patent: Nov. 19, 2013

(54) SYSTEM AND METHOD FOR OPTIMIZING ELECTRICAL POWER CONSUMPTION BY CHANGING CPU FREQUENCY INCLUDING STEPS OF CHANGING THE SYSTEM TO A SLOW MODE, CHANGING A PHASE LOCKED LOOP FREQUENCY REGISTER AND CHANGING THE SYSTEM TO A NORMAL MODE

(75) Inventors: Santhosh Subramanian, Ghaziabad (IN); Rajeev Kapoor, Greater Noida (IN)

(73) Assignee: STMicroelectronics International N.V., Amsterdam (NL)

( * ) Notice: Subject to any disclaimer, the term of this patent is extended or adjusted under 35 U.S.C. 154(b) by 522 days.

(21) Appl. No.: 12/630,668

(22) Filed: Dec. 3, 2009

(65) Prior Publication Data

US 2010/0162018 A1 Jun. 24, 2010

(30) Foreign Application Priority Data

Dec. 5, 2008 (IN) .............................. 2772/Del/2008

(51) Int. Cl.
*G06F 1/00* (2006.01)

(52) U.S. Cl.
USPC ............................ 713/322; 713/300; 713/320

(58) Field of Classification Search
USPC .................................. 713/300, 320, 322, 500
See application file for complete search history.

(56) References Cited

U.S. PATENT DOCUMENTS

| | | | |
|---|---|---|---|
| 7,346,787 B2* | 3/2008 | Vaidya et al. .................. | 713/300 |
| 7,840,825 B2* | 11/2010 | Altevogt et al. .............. | 713/320 |
| 2004/0078606 A1* | 4/2004 | Chen et al. .................... | 713/300 |
| 2006/0174151 A1* | 8/2006 | Lin et al. ....................... | 713/500 |
| 2008/0201591 A1* | 8/2008 | Hu et al. ........................ | 713/323 |
| 2009/0049314 A1* | 2/2009 | Taha et al. ..................... | 713/300 |
| 2009/0204831 A1* | 8/2009 | Cousson et al. .............. | 713/322 |

\* cited by examiner

*Primary Examiner* — Thomas Lee
*Assistant Examiner* — Xuxing Chen
(74) *Attorney, Agent, or Firm* — Hogan Lovells US LLP

(57) ABSTRACT

A system and a method for optimizing power in an electronic device are described. The system may be used to implement low power techniques to achieve maximum performance with low battery utilization. A processing load level monitor monitors load(s) on processors. Processor frequencies are updated through the driver until the load is close to 100%, which means that the core frequency is changed to the load processor around 100% at the minimum possible frequency.

21 Claims, 9 Drawing Sheets

SYSTEM AND METHOD FOR OPTIMIZING ELECTRICAL POWER CONSUMPTION BY CHANGING CPU FREQUENCY INCLUDING STEPS OF CHANGING THE SYSTEM TO A SLOW MODE, CHANGING A PHASE LOCKED LOOP FREQUENCY REGISTER AND CHANGING THE SYSTEM TO A NORMAL MODE

RELATED APPLICATION

The present application claims priority of India Provisional Patent Application No. 2772/Del/2008 filed Dec. 5, 2008, which is incorporated herein in its entirety by this reference.

FIELD OF THE INVENTION

The present disclosure relates to optimization of electrical power and more specifically to a device for optimizing consumption of electrical power to procure maximum performance with the same power utilization.

BACKGROUND

Power management is an essential element for battery operated electronic devices. With the rising performance expectations on multimedia devices, it is important to implement low power techniques to have maximum performance with low battery utilization. Even though multiple parallel execution units increase the performance of the processor, power is wasted when some of the processing units are idle during various time intervals.

Various techniques have been implemented to optimize power. Since the power consumption of the processor is proportional to the frequency, reduction of the frequency of the system clock reduces the power consumption of the microprocessor.

There are some other means to implement this type of power optimization by increasing or decreasing voltage and frequency. But, it is done using dedicated hardware which can monitor and change voltage/frequency of a single processor at one time. This adds the extra cost of a dedicated hardware chipset, which is designed for this purpose. High performance has increased power consumption. What is desired is an embedded application to find the best trade-off between energy efficiency and performance by scaling CPU frequency and voltage levels.

SUMMARY OF THE INVENTION

A system according to an embodiment of the present invention includes a device for optimizing consumption of electrical power. The system preferably includes a processor block, a processing load level monitor coupled to the processor block, and an operating frequency and/or voltage adjustor coupled to the output of the load level monitor and to the processor block. In a method of the present invention, consumption of electrical power is optimized by monitoring processing load levels and adjusting operating frequency and/or voltage. Preferably, the operating voltage and/or frequency is adjusted until the load reaches an optimum level, and the frequency is updated based on the system usage level. The instant invention may be operative to manage multiple cores at no extra cost.

BRIEF DESCRIPTION OF THE DRAWINGS

The aforementioned aspects and other features of the present disclosure will be explained in the following description, taken in conjunction with the accompanying drawings, wherein.

DETAILED DESCRIPTION OF PREFERRED EMBODIMENTS

The embodiments of the present disclosure will be described in detail with reference to the accompanying drawings. However, the present disclosure is not limited to the embodiments and the embodiments described herein in the art of the present disclosure. The disclosure is described with reference to specific circuits, block diagrams, signals, etc. simply to provide a more thorough understanding of the disclosure. The detailed description of the disclosure is as follows:

The present disclosure teaches a system comprising a device for optimizing consumption of electrical power. Said system includes a processor block, a processing load level monitor coupled to the processor block and an operating frequency and/or voltage adjustor coupled to the output of said load level monitor and the processor block. The processing load level monitor monitors and calculates the load of the processors and the operating frequency and/or voltage adjustor updates the voltage and/or frequency of said processors till the load is reached to the optimum level, said frequency is updated based on the system usage level.

The present disclosure also teaches a method for optimizing consumption of electrical power. The method steps include monitoring processing load level and adjusting operating frequency and/or voltage.

The present disclosure further teaches a device for optimizing consumption of electrical power. Said system includes a processor block, a processing load level monitor coupled to the processor block and an operating frequency and/or voltage adjustor coupled to the output of said load level monitor and the processor block. The processing load level monitor monitors and calculates the load of the processors and the operating frequency and/or voltage adjustor updates the voltage and/or frequency of said processors till the load reaches an optimum level. Said frequency is updated based on the system usage level.

The present disclosure also teaches a multimedia system comprising a device for optimizing consumption of electrical power. Said multimedia system includes a processor block, a processing load level monitor coupled to the processor block and an operating frequency and/or voltage adjustor coupled to the output of said load level monitor and the processor block. Processing load level monitor monitors and calculates the load of the processors and the operating frequency and/or voltage adjustor updates the voltage and/or frequency of said processors till the load is reached at an optimum level, and said frequency is updated based on the system usage level.

Figure 1:
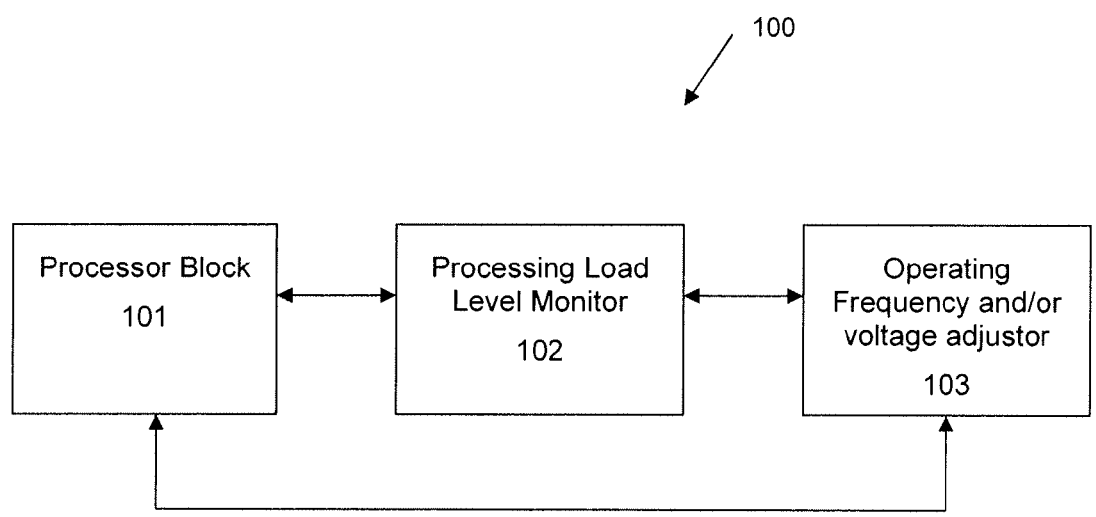
FIG. 1 illustrates a block diagram of a device for optimizing consumption of electrical power in accordance to an embodiment of the present disclosure.

FIG. 1 represents a block diagram of a device for optimizing consumption of electrical power. The device includes a processor block (101), a processing load level monitor (102) coupled to said processor block and an operating frequency and/or voltage adjustor (103) coupled to the output of said load level monitor. The processor block includes one or more processors. The processors of the processor block can have the same or different operating frequencies. The processing load level monitor comprises a plurality of processing load level monitor one for each processor. The operating frequency and/or voltage adjustor updates the voltage and/or frequency of said processors till the load is reached at an optimum level, and said frequency is updated based on the system usage level. Said processing load level monitor calculates the idle time of the processor for determining the load in the processor.

Figure 2:
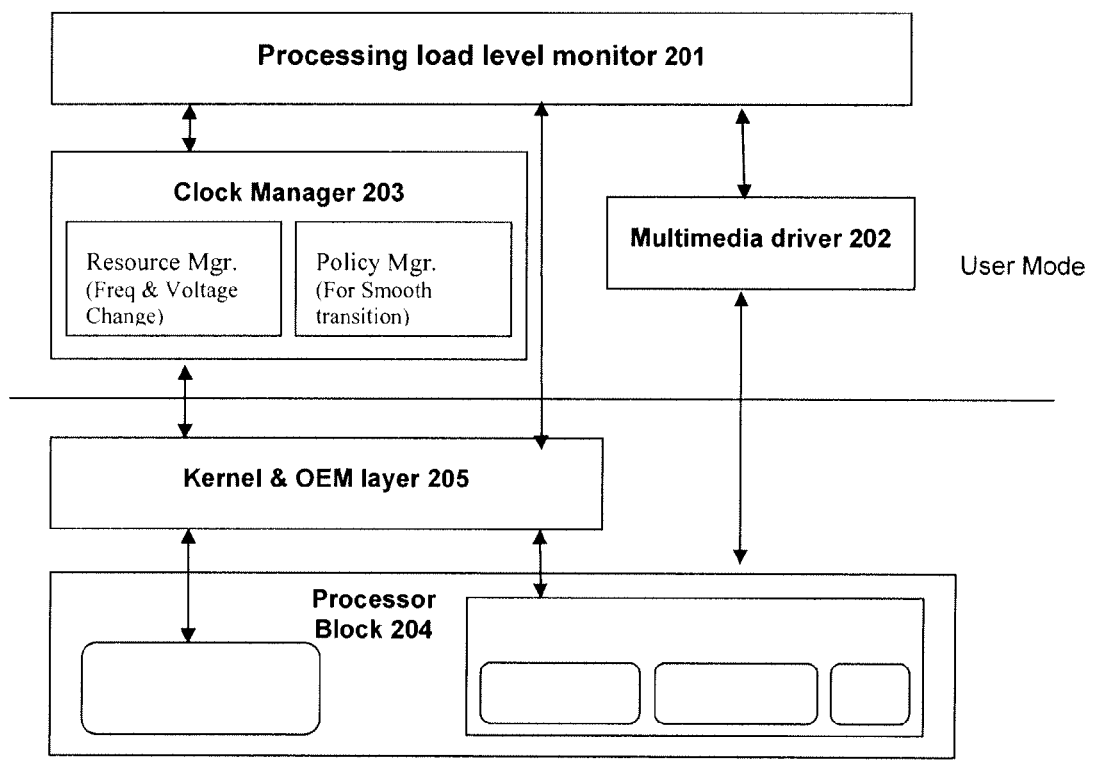
FIG. 2 illustrates a block diagram of a device for optimizing consumption of electrical power according to another embodiment of the present disclosure.

FIG. 2 illustrates a block diagram of a device for optimizing consumption of electrical power according to another embodiment of the present disclosure. The device includes a processor block (204), a processing load level monitor (201) coupled to said processor block and a clock manager (203) coupled to the output of said load level monitor. The processing load level monitor (201) keeps on monitoring the load on the processors and DSP cores, where the multimedia & other applications are processed. The calculated load is communicated through a kernel (205) and a multimedia driver (202). Voltage and frequency are updated through the clock manager (203) till the load is reached close to 100%. The frequency is updated to load processor around 100% at minimum possible frequencies to provide better performance at optimum power consumption. The processor block (204) of the electronic device includes various kinds of processors such as ARM, Multimedia DSPs (video, audio, etc), which are running at same or different frequencies. The frequency is dynamically scaled on the processor block based on the Load of the processors and DSPs. The Kernel & OEM layer (205) calculates the idle time in the processor which helps in determining load in the processor. If the CPU or DSP load comes around 80% or below, then the operating frequency is decreased. If the load goes above 80% then the frequency is increased. This process continues until it reaches the optimum level.

An application sends a request through the frequency and/or voltage adjustor to update the operating frequency and voltage level (if required). The processing load level monitor changes the frequency based on the system usage level, is not based on the user application (e.g., VOIP call/video playback, etc.), and is expandable to any number of processors in the system on chip (SoC).

System power consumption in a digital based system is described as:

$$Power = C \times V^2 \times F$$

where C is the capacitance being switched per clock cycle, V is voltage, and F is the processor frequency (cycles per second).

There will be a relative effect in power consumption level with respect to the change in the voltage or frequency.

Frequency reduction brings down the number of instructions a processor can issue in a given amount of time, hence performance is reduced. Therefore, it is generally used when the workload is low. In contrary, performance is increased by raising the processor's frequency beyond the manufacturer's design specifications.

Table 1 which follows shows different frequencies and applications thereof.

TABLE 1

Frequencies and Applications

| ARM/CPU Frequencies in MHz | Bus/DSP Frequencies in MHz | Voltage Supply for the APE | Description | Application |
| --- | --- | --- | --- | --- |
| 66.0 | 66.0 | 1.20 | For optimum power and performance requirements when workload is low. | MP3 playback with display off. |
| 81.6 | 81.6 | 1.20 | | |
| 100.8 | 100.8 | 1.20 | | |
| 201.6 | 132.0 | 1.20 | | |
| 264.0 | 132.0 | 1.20 | Normal mode | Normal mode |
| 307.2 | 153.6 | 1.34 | Where slightly higher performance on CPU & High performance on DSP are required. | To handle complex video types like H.264, VC1, etc. |
| 326.4 | 163.2 | 1.34 | | |
| 393.6 | 131.2 | 1.34 | Where CPU needs High performance & normal DSP | Video playback with size > VGA (more data processing on CPU) |
| 489.0 | 163 | 1.5 | Where CPU as well as DSP needs Very High performance | Very high bitrate data processing for GPS/3D Games, etc. |

Broadly speaking there are two fundamental methods provided by an Operating System to measure CPU Usage. The facilities provided by Windows CE/Windows Mobile for measuring CPU load are described below. Application Programming Interface may vary from one Operating System (OS) to another, but the method will be same.

Thread CPU usage is helpful to measure CPU usage of a particular thread. GetThreadTimes in Windows embedded obtains timing information about a specified thread. Thread CPU usage can be used in the following two ways:

CPU Load: Enumerate all the threads and add the CPU times of each thread. This can be used to calculate the CPU usage.

Thread Load: If an operation in an Use Case is executed by a single thread, then the CPU load of this particular thread, effectively measures the performance of the operation.

Each OS provides a means to know the CPU idle time. This can be used to calculate the overall CPU Load. Windows Embedded provides GetIdleTime, GetTickCount to help measure the CPU idle time during a particular period. For Multimedia processors like Audio/Video DSPs, firmware support need to be added with custom APIs, which will provide the DSP load information on demand. If these types of APIs are not available from OS then similar APIs are needed to be developed by calculating the MIPS (Million instructions per second) and MCPS (Million clocks per second).

The following steps need to be carried out dynamically in order to scale the system from one frequency to other.

Configuration of the processor in a predetermined voltage range depending upon the kind of processor used.

Updating of the CPU and BUS Frequency. Memory controller configuration, based on the frequency change. (presented in Table 1)

Gating of processor peripheral clocks for additional power saving.

Peripheral Clock Status on various use cases are shown in Table 2. Comparison between FULL and IDLE processor is presented. When the system is running at Normal Frequency difference is found in the Microprocessor Core current. Same benefit can be achieved when clocks are gated after scaling to a lower frequency.

Figure 4:
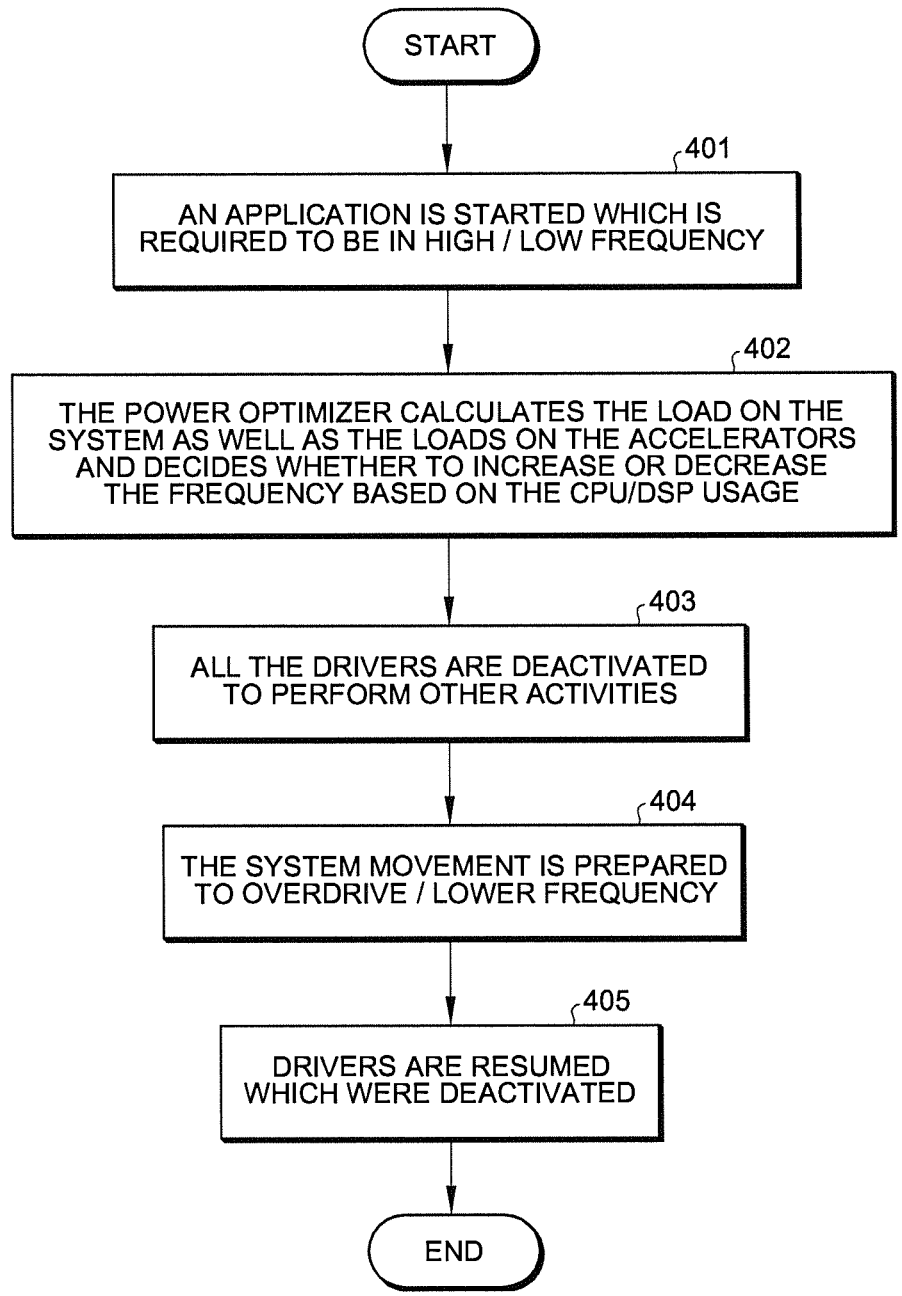
FIG. 4 illustrates a flow diagram of a method for optimizing consumption of electrical power according to another embodiment of the present disclosure.

FIG. 4 illustrates a flow diagram of a method for optimization of power in accordance with the present disclosure. In step 401 applications are started which are required to be in High/Low Frequency. In step 402, the processing load level monitor calculates the load on the system as well as the load on accelerators and decides whether to increase or decrease the frequency based on the CPU/DSP usage. In the next step 403 all the drivers are deactivated to perform other activities. In step 404 the system movement is prepared to overdrive/lower the frequency by performing the following sub steps:

a. Prepare the system to execute in sync with CLCDC vsync
   b. Preparation of Code to run from Cache/ESRAM
   c. Disable MMU and put SDRAM in self refresh mode.
   d. Change the voltage (if required)
   e. Prepare the system movement
   f. Set to Normal mode and wait for Normal to take place
   g. Configure Memory controller (SDMC) timing values
   h. Enable MMU and get SDRAM out off self refresh In step 405 drivers are resumed which has been suspended/frozen.

Figure 5:
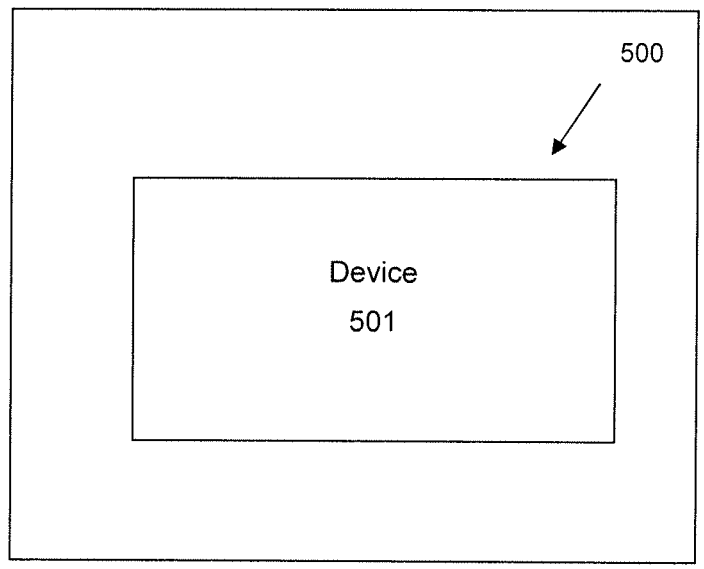
FIG. 5 illustrates a system for optimizing consumption of electrical power in accordance to the present disclosure.

FIG. 5 illustrates a system (500) comprising a device (501) for optimizing consumption of electrical power.

Figure 6:
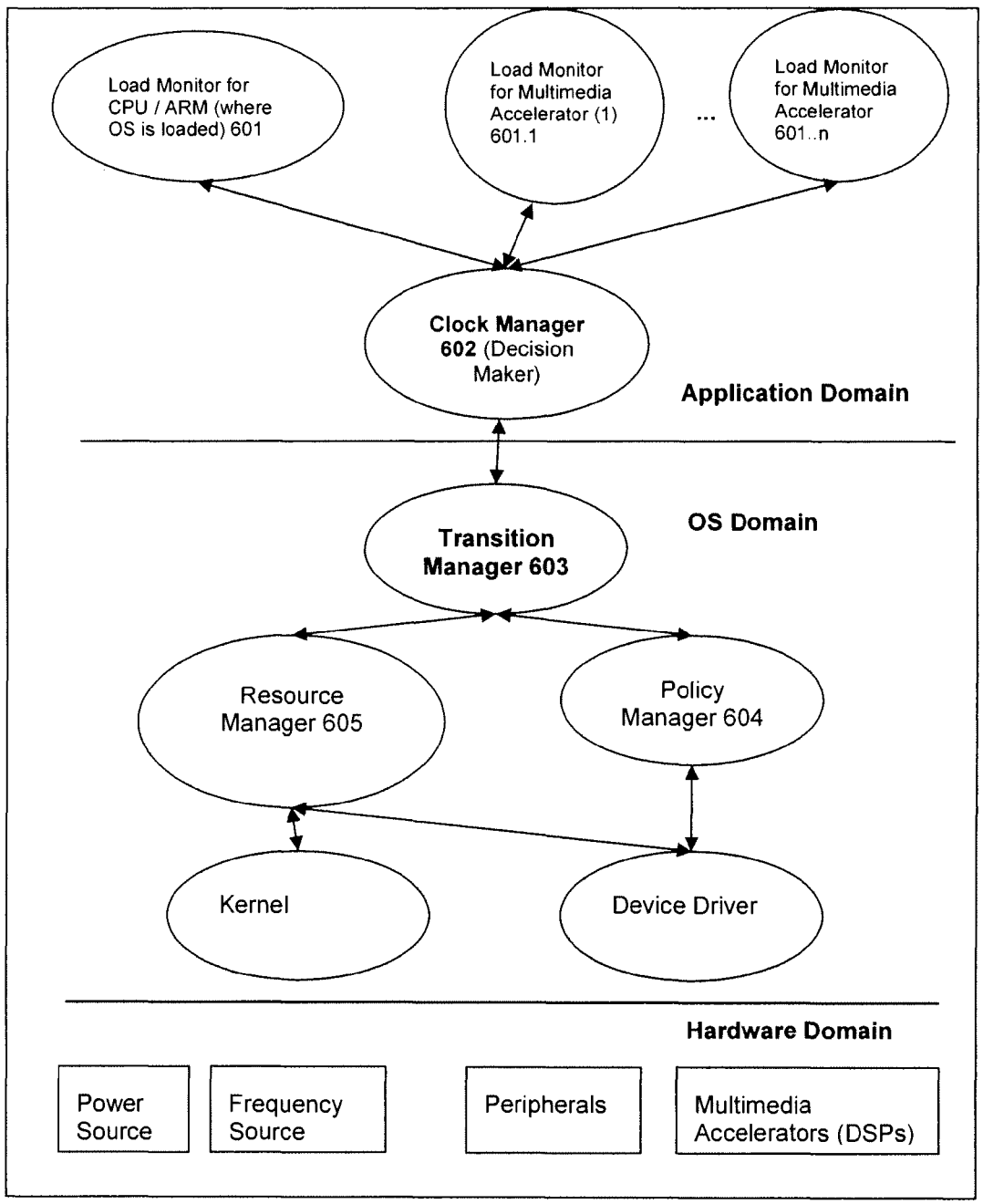
FIG. 6 represents a detailed diagram of the device as illustrated in FIG. 2.

FIG. 6 illustrates an electronic device implementing a processing load level monitor in accordance with the present disclosure. The electronic device includes at least one Load Monitor (601.1, 601.2 ... 601.n), which monitors the loads on the processors of the SoC and monitors for the start of applications which are required to be in a High/Low frequency. A clock manager (602) is implemented which centralizes all frequency change requests. Decisions to increase or decrease the frequency are taken at this level. This is basically required

TABLE 2

| | USE CASES | | | | | | | | |
|---|---|---|---|---|---|---|---|---|---|
| | DMA0/1, SDMC/ SMC | Video | Audio | CLCD | GPIO | MSP1 | MSP/USB/ UART/ SSP/... | SDIO | I2C0/ I2C1 |
| | | | | Peripheral Clock | | | | | |
| Full | On | On | On | On | On | On | On | On | On |
| Audio Playback | On | Off | On | Off | On | On | Off | On | On |
| Video Playback (Decoding & Rendering) | On | On | On | On | On | On | Off | On | On |
| Idle | On | Off | Off | On | On | Off | Off | Off | Off |
| Idle/LCD Off | On | Off | Off | Off | On | Off | Off | Off | Off |

Figure 3:
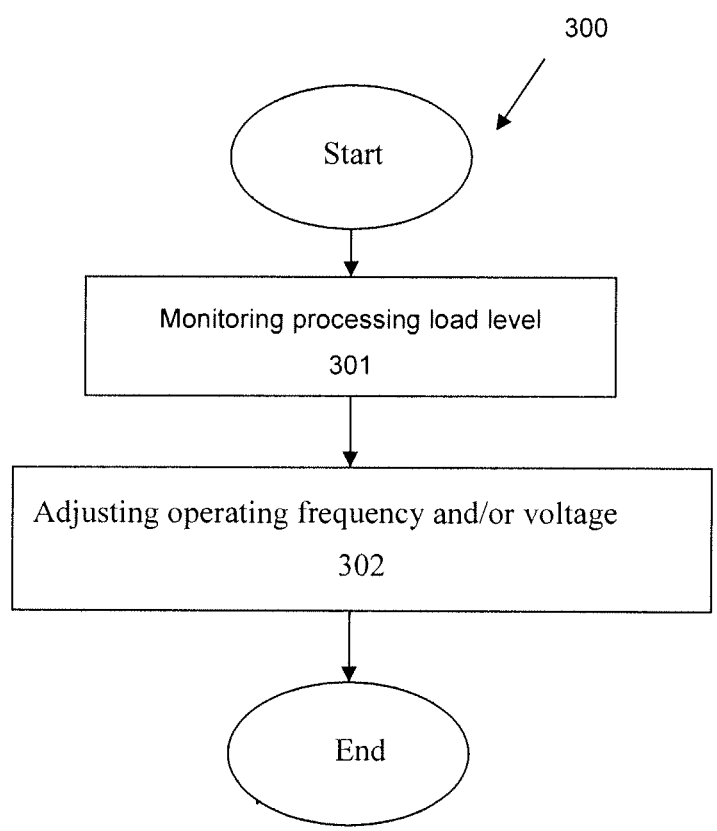
FIG. 3 illustrates a flow diagram of a method for optimizing consumption of electrical power in accordance to the present disclosure.

Embodiments of the method for optimizing consumption of electrical power are described in FIG. 3 and FIG. 4. The methods are illustrated as a collection of blocks in a logical flow graph, which represents a sequence of operations that can be implemented in hardware, software, or a combination thereof. The order in which the process is described is not intended to be construed as a limitation, and any number of the described blocks can be combined in any order to implement the process, or an alternate process.

Figure 7:
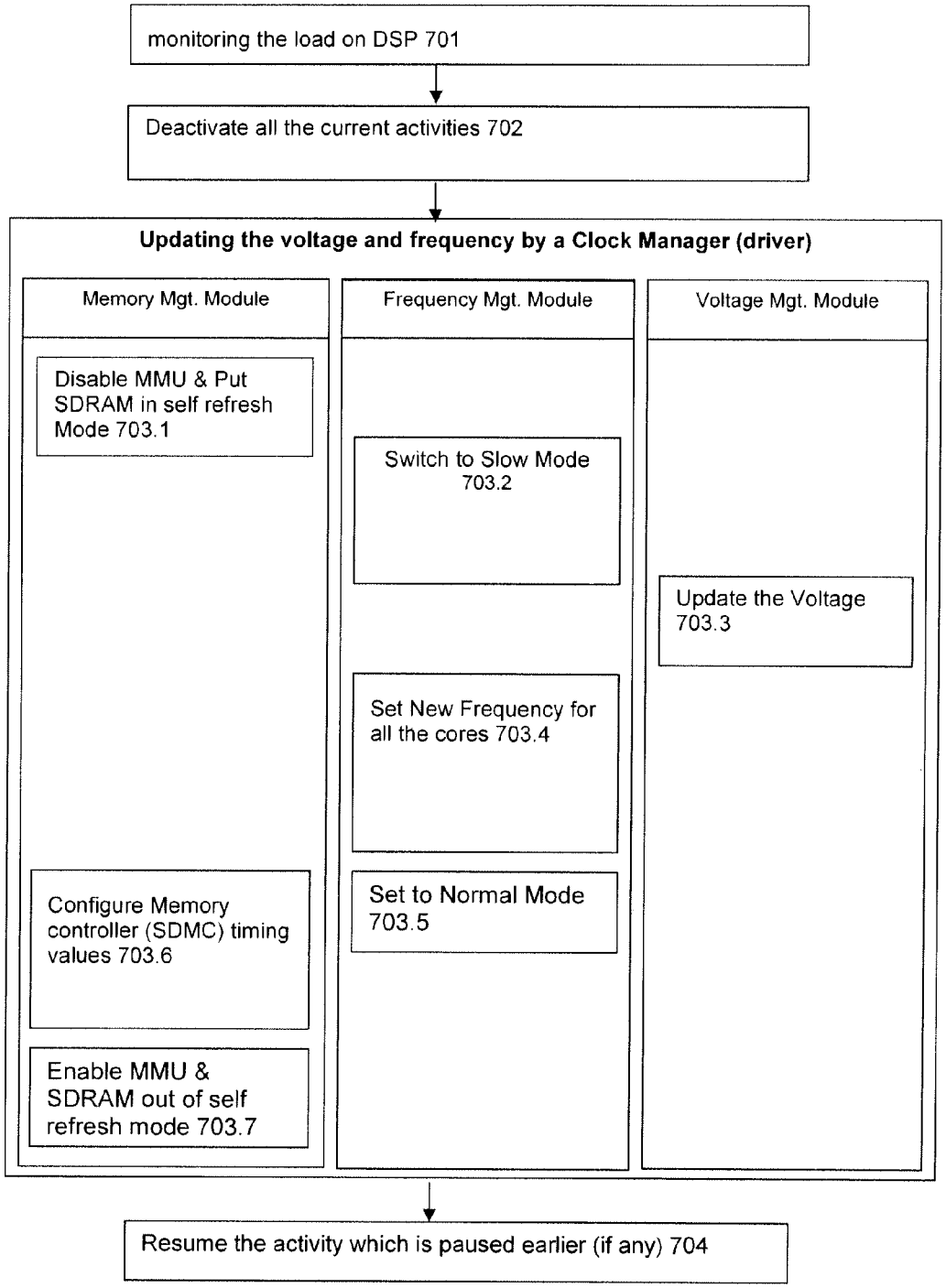
FIG. 7 illustrates a pictorial representation of the steps involved in scaling the frequency and voltage according to the present disclosure.

FIG. 3 illustrates a flow diagram of a method for optimizing consumption of electrical power in accordance to the present disclosure. The method monitors processing load level of the processor in step 301 and then adjusts the operating frequency and/or voltage in step 302. The operating voltage and/or frequency are adjusted till the load is reached to the optimum level, and the frequency is updated based on the system usage level.

to standardize the application calling interface. A transition manager (603) of the processing load level monitor controls all the transitions. A Policy Manager (604) is included to ensure smooth transitions and to perform steps 3 and 5 of the method of optimizing power as explained in FIG. 4. A resource manager (605) of the clock manager helps in scaling the frequency and voltage. The resource manager helps in performing step 4 of the method of optimizing power as explained in FIG. 4. The resource manager prepares the system movement to overdrive/lower the frequency by performing the following steps:

1. Prepare the system to execute in sync with CLCDC vsync
2. Preparation of Code to run from Cache
   a. disable interrupts
   b. prefetch code to iCache 3. Put SDRAM in self refresh
   a. put the DDR memory in self-refresh mode
4. Change voltage (Range mentioned in the hardware specification based on the frequency)
   a. Write to Power Management chip available in SoC.
   b. Disable VDD monitoring to avoid Sleep mode when we increase/decrease VDD core
   c. change VDD core value
   d. Wait for settling time (600 us)
   e. Re-enable VDD monitoring.
5. Change Frequency (Normal->Slow->Overdrive)
   a. Go in SLOW mode
   b. Change the PLL frequency register
   c. Go in NORMAL mode (and wait for NORMAL mode)
6. Change SDMC configuration to execute in changed frequency
   a. Program the new Memory controller (SDMC) timing values.
7. Get SDRAM out off self refresh
   a. Enable the SDMC DLL and wait the locked bit status
   b. Exit DDR memory from self-refresh
   c. return on the function call in DDR FIG. 7 illustrates a pictorial representation of the steps involved in scaling the frequency and voltage. The processing load level monitor monitors the load on DSP in step 701. In step 702, all the current activities like Playback/Direct memory access (DMA) transfer/any access to memory/Display are stopped. Voltage and frequency are updated through a clock manager driver till the load is reached close to 100% in step 703. A memory management module disables Memory Management Unit (MMU) and put synchronous dynamic random access memory (SDRAM) in self refresh mode in step 703.1. A frequency management module switches to slow mode by bringing the CPU in wait for interrupt mode in step 703.2. PLLs are running at this stage and all peripheral clocks used are gated. A voltage management module increase or decrease the voltage based on the requirement in step 703.3. A new frequency is set for all the cores which are monitored by the frequency management module in step 703.4. After setting the new frequency, the normal mode is set in step 703.5 by said frequency management module. In step 703.6 configuration of memory controller timing values are taken place. The memory management module enables MMU and SDRAM out of self refresh mode in step 703.7. After voltage and frequency are updated, all the activities are resumed which is paused earlier.

The following factors are considered during all the transitions:
1. To change the voltage. The time taken for these changes need to be synchronized with software execution. System should suspend all executions as long as the change has not occurred.
2. Prepare the system to execute in sync with CLCDC vsync. All execution of the up/down scaling has to be completed during the vsync time period. Otherwise we can notice artifacts in display.
3. SDRAM in self refresh. As SDRAM in self refresh mode, we need to stop all access to SDRAM from bus. Resource manager's function, which does the transition, should be placed either in cache or in embedded SRAM.
4. This application can request the frequency change at any time and the system can be in any execution state. This means any application/driver can be doing any memory/peripheral related operations. We need to suspend/stop these operations and resume them after the transition.

Figure 8:
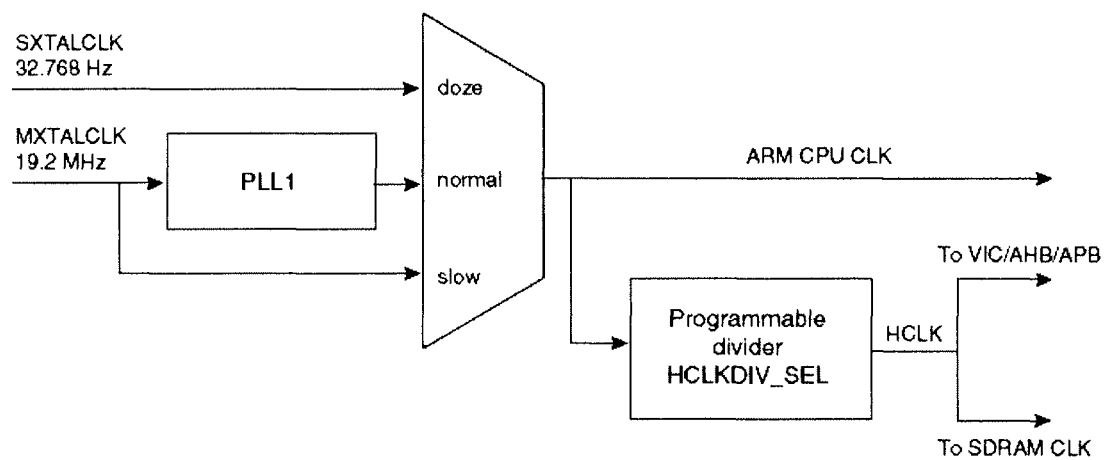
FIG. 8 depicts a block diagram of a frequency controller according to the present disclosure.

FIG. 8 depicts a block diagram of a frequency controller according to the present disclosure. PLL frequency control register need to be updated for any change in the clock frequency. APE must be switched to slow mode before changing the frequency. Changing the clock while the system is running can have unpredictable effects on PLL1. Once the frequency from PLL has been stabilized, the system can be moved back to normal mode.

Figure 9:
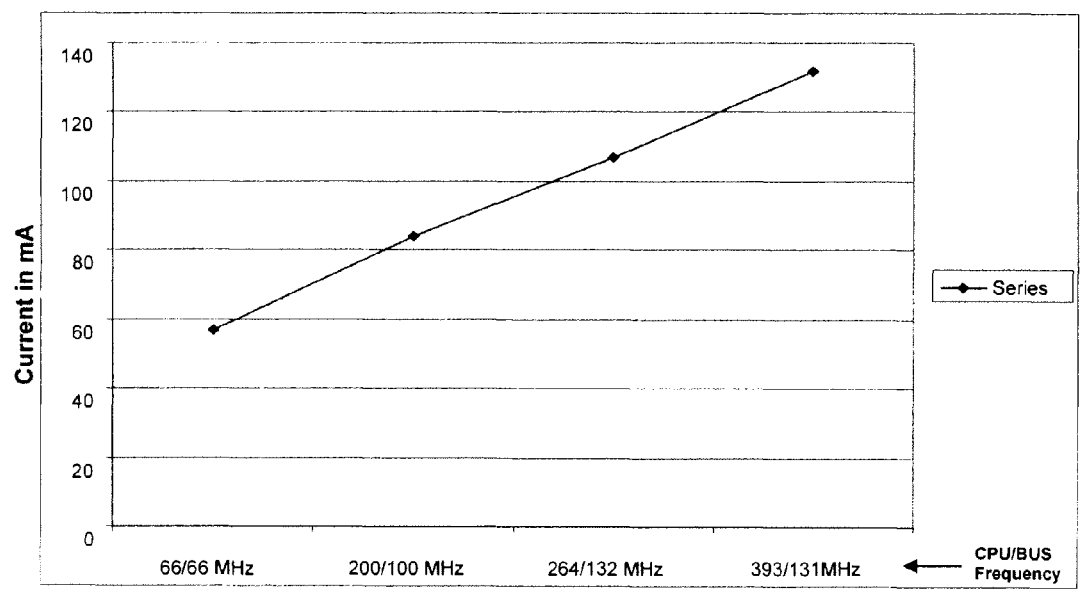
FIG. 9 represents a graph of power consumption during audio playback.

FIG. 9 represents a graph of power consumption during audio playback. This figure shows the comparison of power consumption at different (CPU/BUS) frequencies. Around 40% difference is noticed with 66 MHZ and 264 MHz (Normal). This data is captured using a reference board, which has ARM 926EJ 32-bit RISC CPU and MMDSPs for Audio and Video. Scale the CPU frequency and the Voltage of APE to provide enough processing speed to process a specific use case.

For more clarity, the following two examples are given:
If the performance of MP3 playback at the processor's core frequency 64 MHz is similar to the playback at 264 MHz, it is better to use 64 MHz only, which saves power. See FIG. 6.
3D Games and GPS application, which takes more load on the multimedia processor should be played at a higher clock frequency to get the maximum performance.

Although the disclosure of the instant disclosure has been described in connection with the embodiment of the present disclosure illustrated in the accompanying drawings, it is not limited thereto. It will be apparent to those skilled in the art that various substitutions, modifications and changes may be made thereto without departing from the scope and spirit of the disclosure.

We claim:

1. A system comprising a device for optimizing consumption of electrical power in the system, the system comprising:
   a processor block;
   a processing load level monitor coupled to said processor block through a kernel and a multimedia driver; and
   an operating frequency and/or voltage adjustor coupled to the output of said load level monitor and to the processor block;
   wherein the frequency and/or voltage adjustor comprises a clock manager;
   wherein the clock manager comprises a transition manager for determining the required frequency and/or voltage changes, a policy manager for ensuring smooth transition during frequency and/or voltage changes, and a resource manager for scaling the voltage and/or frequency;
   wherein the resource manager changes the voltage and/or frequency by changing the voltage, followed by changing the frequency in the case that changes in the frequency are to be implemented; and
   wherein changing the frequency comprises changing the system to a slow mode, changing a Phase Locked Loop (PLL) frequency register, and changing the system to a normal mode.

2. The system as claimed in claim 1, wherein the processor block includes at least one processor.

3. The system as claimed in claim 2, wherein the processor block includes a plurality of processors having the same or different frequencies.

4. The system as claimed in claim 1, wherein the processing load level monitor comprises a plurality of processing load level monitors, one for each processor.

5. The system as claimed in claim 1, wherein the operating frequency and/or voltage adjustor updates the voltage and/or frequency of said processors until the load is reached to the optimum level, and said frequency is updated based on the system usage level.

6. The system as claimed in claim 1, wherein said processing load level monitor calculates the idle time of the processor for determining the load in the processor.

7. The system of claim 1 wherein the policy manager ensures smooth transitions during frequency and/or voltage changes by deactivating drivers before performing the frequency and/or voltage changes and resuming the drivers after the frequency and/or voltage changes.

8. A device comprising components for optimizing consumption of electrical power, said device comprising:
   a processor block;
   a processing load level monitor coupled to said processor block through a kernel and a multimedia driver; and
   an operating frequency and/or voltage adjustor coupled to the output of said load level monitor and to the processor block;
   wherein the frequency and/or voltage adjustor comprises a clock manager;
   wherein the clock manager comprises a transition manager for determining the required frequency and/or voltage changes, a policy manager for ensuring smooth transition during frequency and/or voltage changes, and a resource manager for scaling the voltage and/or frequency;
   wherein the resource manager changes the voltage and/or frequency by changing the voltage, followed by changing the frequency in the case that changes in the frequency are to be implemented; and
   wherein changing the frequency comprises changing the system to a slow mode, changing a Phase Locked Loop (PLL) frequency register, and changing the system to a normal mode.

9. The device as claimed in claim 8, wherein the processor block includes at least one processor.

10. The device as claimed in claim 9, wherein the processor block includes a plurality of processors having the same or different frequencies.

11. The device as claimed in claim 8, wherein the processing load level monitor comprises a plurality of processing load level monitors, one for each processor.

12. The device as claimed in claim 8, wherein the operating frequency and/or voltage adjustor updates the voltage and frequency of said processors until the load is reached to the optimum level, and said frequency is updated based on the system usage level.

13. T1he device as claimed in claim 8, wherein said processing load level monitor calculates the idle time of the processor for determining the load in the processor.

14. The device of claim 8 wherein the policy manager ensures smooth transitions during frequency and/or voltage changes by deactivating drivers before performing the frequency and/or voltage changes and resuming the drivers after the frequency and/or voltage changes.

15. A multimedia system comprising a device for optimizing consumption of electrical power, said multimedia system comprising:
   a processor block;
   a processing load level monitor coupled to said processor block through a kernel and a multimedia driver; and
   an operating frequency and/or voltage adjustor coupled to the output of said load level monitor and to the processor block;
   wherein the frequency and/or voltage adjustor comprises a clock manager;
   wherein the clock manager comprises (1) a transition manager for determining the required frequency and/or voltage changes, (2) a policy manager for ensuring smooth transition during frequency and/or voltage changes, and (3) a resource manager for scaling the voltage and/or frequency;
   wherein the resource manager changes the voltage and/or frequency by changing the voltage, followed by changing the frequency in the case that changes in the frequency are to be implemented; and
   wherein changing the frequency comprises changing the system to a slow mode, changing a Phase Locked Loop (PLL) frequency register, and changing the system to a normal mode.

16. The multimedia system as claimed in claim 15, wherein the processor block includes at least one processor.

17. The multimedia system as claimed in claim 16, wherein the processor block includes a plurality of processors having the same or different frequencies.

18. The multimedia system as claimed in claim 15, wherein the processing load level monitor comprises a plurality of processing load level monitors, one for each processor.

19. The multimedia system as claimed in claim 15, wherein the operating frequency and/or voltage adjustor updates the voltage and/or frequency of said processors till the load reaches an optimum level, and said frequency is updated based on the system usage level.

20. The multimedia system as claimed in claim 15, wherein said processing load level monitor calculates the idle time of the processor for determining the load in the processor.

21. The multimedia system of claim 15 wherein the policy manager ensures smooth transitions during frequency and/or voltage changes by deactivating drivers before performing the frequency and/or voltage changes and resuming the drivers after the frequency and/or voltage changes.

\* \* \* \* \*

UNITED STATES PATENT AND TRADEMARK OFFICE
CERTIFICATE OF CORRECTION

| | |
|---|---|
| PATENT NO. | : 8,589,707 B2 |
| APPLICATION NO. | : 12/630668 |
| DATED | : November 19, 2013 |
| INVENTOR(S) | : Santhosh Subramanian et al. |

It is certified that error appears in the above-identified patent and that said Letters Patent is hereby corrected as shown below:

In the Claims:

Column 9, line 50, "T1he" should be --The--

Signed and Sealed this
Eighteenth Day of February, 2014

Michelle K. Lee
*Deputy Director of the United States Patent and Trademark Office*